March 15, 1966 H. M. McKAY 3,240,300
BI-DIRECTIONAL LOCK
Filed Sept. 9, 1963 2 Sheets-Sheet 1

INVENTOR
HARRY M. McKAY
BY Cohn and Powell
ATTORNEYS

INVENTOR
HARRY M. McKAY
BY Cohn and Powell
ATTORNEYS

United States Patent Office 3,240,300
Patented Mar. 15, 1966

3,240,300
BI-DIRECTIONAL LOCK
Harry M. McKay, Warrenton, Mo., assignor to The Binkley Company, Warrenton, Mo., a corporation of Missouri
Filed Sept. 9, 1963, Ser. No. 307,572
9 Claims. (Cl. 192—8)

This invention relates generally to improvements in a bi-directional lock, and more particularly to an improved lock mechanism in which a driven shaft is held against rotation in both directions as soon as the drive ceases to operate.

In the heretofore conventional type of self-locking mechanism, spring-loaded balls or rollers have been utilized with a cooperating cam to wedge between the cam and a fixed drum. In such known devices, the driving member is connected with the driven member with a certain play allowing for an initial lost-motion of the driving member which is used to unwedge the balls or rollers prior to the establishment of a positive coupling through the action of a release plate. If the driven shaft is submitted, after release of the locking balls or rollers, to a torque independent from the driving power and tending to move the driven shaft in the same direction as this power, there is a tendency for the driving shaft to overrun the driven member which tends to cause a succession of short-lived rewedging of the balls or rollers. The desired drive can only be accomplished by a series of successive wedgings and unwedgings under these circumstances which produced shocks or jerks in the drive of the driven member. These disadvantages are said to be overcome in some cases by different ways of applying a turning force to the cam by the drive member, as disclosed in U.S. Patent No. 2,559,960.

An important object of the present invention is to improve the self-locking device of the type referred to above, and to eliminate the successive jerks in the operation by the provision of frictional shoes between the cam slopes and reaction surface having a sliding contact with the reaction surface, and of projections on a release plate which back the shoes off a sufficient distance depending upon the torque applied to the shaft tending to turn the shaft in the same direction so that the same load applied by the cam to the shoes overcomes the friction between the shoes and reaction surface whereby the cam and shoes can turn, yet maintains sufficient friction between the shoes and reaction surface to preclude the cam from overriding to relock itself.

Another important objective is achieved by the construction of the shoe in that the shoe has an outer bearing surface slidably engaging the reaction surface, and has means contacting the associated cam plate about which the shoe turns as the shoe wears.

Other important advantages are afforded by the structural arrangement of a cylindrical bearing element or roll carried transversely of the inner surface of the shoe, the cylindrical bearing element contacting the associated cam slope to maintain the inner side of the shoe in spaced relation to the cam slope and to provide a pivot about which the shoe turns.

An important object is realized by placing the region of contact of the shoe means with the associated cam slope so that it is offset from a radial line extending from the shaft axis to the center of the outer frictional slide bearing surface of the shoe, thereby assuring that the shoe has a tendency to tilt as it frictionally slides along the reaction track of the stationary drum. The offset is in the direction of shoe movement to overcome the wedging action.

Another important object is achieved by the structural arrangement of the bi-directional lock and its assembly and connection to a driven shaft and the casing for a drive member, whereby the lock unit can be axially moved along and off of the shaft after detachment of the unit housing in order to gain access to the drive mechanism in the casing without taking the lock unit apart.

Still another important object is obtained by having a collar on the cam which extends out one end of the housing for detachable connection to the driven shaft, and by having means on the release plate extending out the other end of the housing and into interfitting relation with the drive member to provide a drive connection, the housing being readily detached from the drive casing, the cam from the shaft and the release plate from the drive member in order to remove the lock unit slidably from the driven shaft without disassembly of the lock unit.

It is an important objective to provide a bi-directional lock assembly that is simple and durable in construction, economical to manufacture and assemble, highly efficient in operation, and which is fully automatic in operation.

The foregoing and numerous other objects and advantages of the invention will more clearly appear from the following detailed description of a preferred embodiment, particularly when considered in connection with the accompanying drawings, in which.

Figures 1, 2:
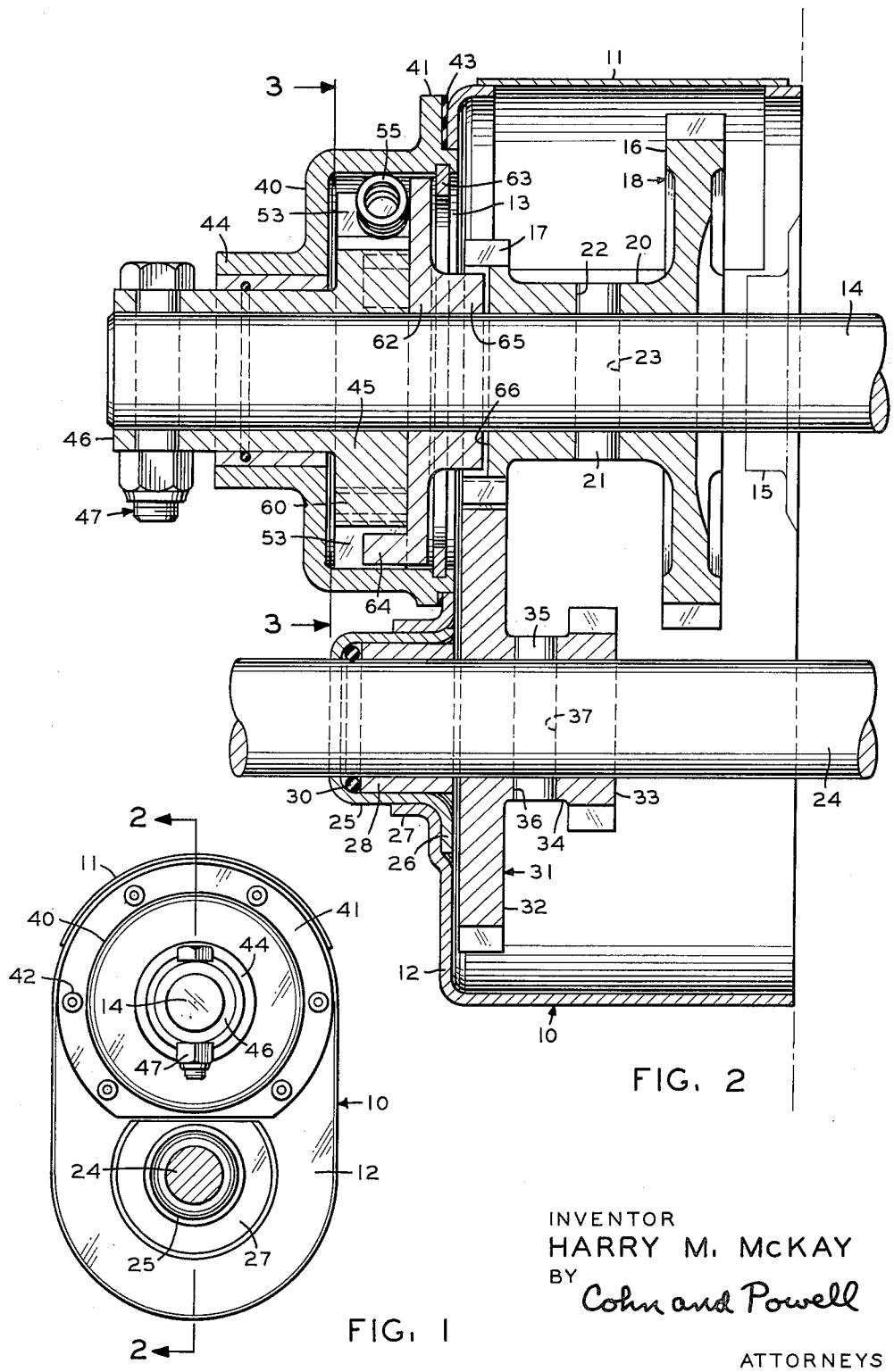
FIG. 1 is a side elevational view of the bi-directional lock and its assembly to a drive unit.
FIG. 2 is an enlarged cross sectional view as seen along line 2—2 of FIG. 1.

Referring now by characters of reference to the drawing, and first to FIG. 1, in which a drive assembly is disclosed, it will be noted that the drive assembly includes a casing generally indicated at 10 having a peripheral side wall 11 that is closed at the front by wall 12. The upper portion of the front wall 12 is provided with a circular opening 13 through which a driven shaft 14 extends. A bearing 15 within the casing 10 rotatively supports and journals the driven shaft 14.

The driven shaft 14 may be conveniently connected to many different types of mechanisms. As, for example, the shaft 14 may be connected to gearing in a landing strut for a truck trailer of the type fully disclosed in applicant's prior U.S. Patents Nos. 3,010,699 and 3,033,522.

Located within the casing 10 and mounted on the transverse driven shaft 14 is an integral double gear consisting of a large gear 16 and a smaller gear 17 interconnected by a common hub 20. The gear hub 20 is secured to the driven shaft 14 by a pin 21 extending through aligned hub slot 22 and shaft bore 23. It will be importantly noted that the hub slot 22 is slightly elongated in a transverse direction relative to the pin 21 so that there is a slight lost or limited motion between the double gear 18 and its mounting shaft 14. The front face of the smaller gear 17 is located closely adjacent the front opening 13 in the casing 10.

A drive shaft 24 extends transversely through the casing 10 immediately below the driven shaft 14. In the preferred embodiment the drive shaft 24 is located parallel to the driven shaft 14. A cup-shaped retainer 25 is located over that portion of the drive shaft 24 extending outwardly of the front wall 12, the retainer 25 having an outwardly flared peripheral flange 26 that is fitted under an outwardly projecting collar 27 of the front wall 12. A bearing 28 is located within the retainer and rotatively journals the drive shaft 24. An O-ring 30 is located about the drive shaft 24 within the retainer 25 and outwardly of the bearing 28, the O-ring 30 providing a seal.

As is usual, the drive shaft 24 may be attached to a crank (not shown) or to some power means such as an electric motor (not shown).

Another double gear 31 is operatively carried on and connected to the drive shaft 24, the double gear 31 including a large gear 32 and a smaller gear 33 interconnected by a common hub 34. The large gear 32 meshes with the smaller gear 17 mounted on the driven shaft 14 as is disclosed in FIG. 2. The smaller gear 33 meshes with the larger gear 16 on the driven shaft 14 when the drive shaft 24, together with its double gear 31, is shifted to the right in FIG. 2 in order to obtain a different gear ratio drive between the drive shaft 24 and driven shaft 14. The double gear 31 is drivingly attached to the drive shaft 24 by a pin 35 extending through aligned hub slots 36 and shaft bore 37.

The lock unit includes a substantially cup-shaped housing 40 having an outwardly extending peripheral flange at its rear end detachably connected to the front casing wall 12 by a plurality of cap screws 42. A gasket 43 is placed between the housing 40 and front casing wall 12. The housing 40 includes a forwardly projecting collar portion 44 located about the driven shaft 14. It will be noted that the housing 40 covers the front wall opening 13 of casing 10 and surrounds that portion of the driven shaft 14 extending outwardly of the casing 10.

Located about the driven shaft 14 and located within the housing 40 is a cam 45, the cam 45 including an integral sleeve portion 46 extending through the housing collar 44 and outwardly along the shaft 14. A nut and bolt referred to as 47 securely fastens the cam sleeve 46 to the end of shaft 14 ahead of the housing 40. The cam 45 is rotated directly by shaft 14 through this connection of the nut and bolt 47.

Figure 3:
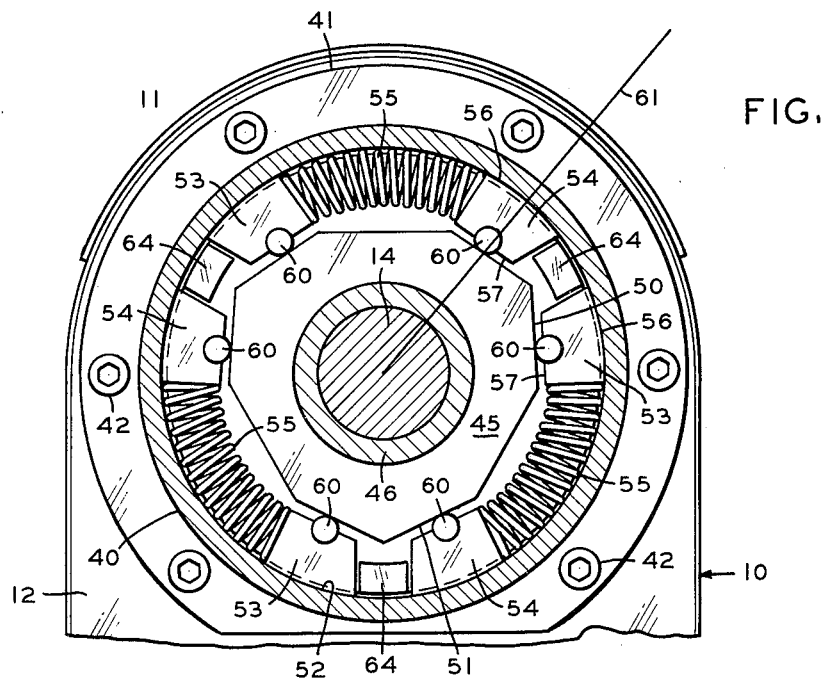
FIG. 3 is a view, partly a cross section, as seen along line 3—3 of FIG. 2.
Figure 4:
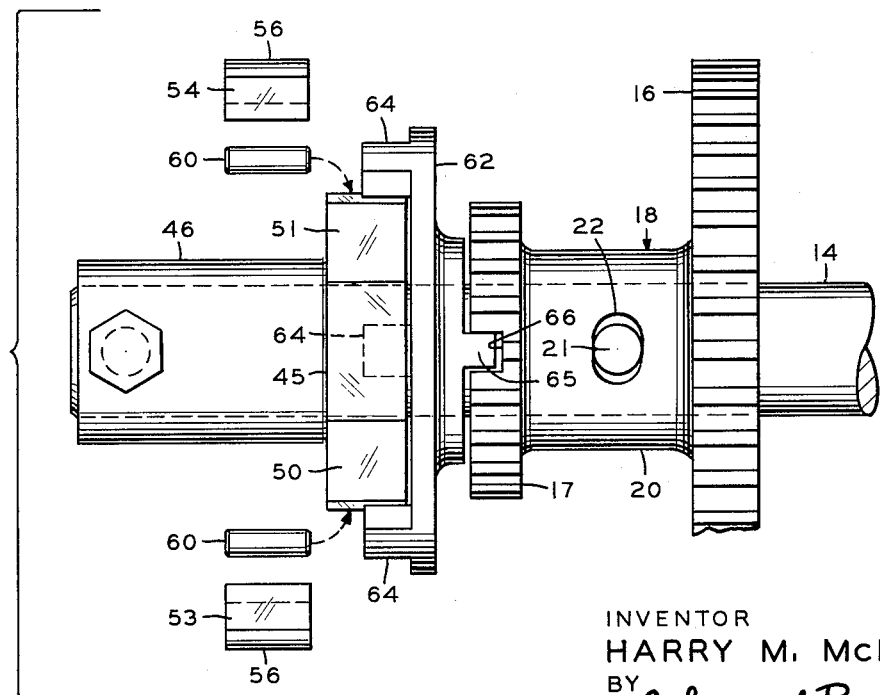
FIG. 4 is a fragmentary, partly exploded, top plan view of the bi-directional lock without the cup-shaped housing and of the driving member.

As is best seen in FIG. 3, the cam 45 is provided with a plurality of pairs of opposed slopes 50 and 51 spaced inwardly from a peripheral reaction surface or track 52 formed on the inside of housing 40. A plurality of pairs of friction shoes 53 and 54 are disposed between the cam slopes 50 and 51 respectively and the reaction surface 52. A compression spring 55 constituting a resilient means is interposed between each pair of shoes 53 and 54, the spring 55 tending to hold the shoes 53 and 54 in wedging engagement with the cam slopes 50 and 51 respectively and the reaction surface 52 to lock the cam 45 and driven shaft 14 to the fixed housing 40.

Each shoe 53 or 54 is constructed of sintered bronze having a high coefficient of friction, and having an arcuate outer bearing surface 56 that slidably engages the reaction surface 52. The inner surface 57 of each shoe 53 or 54 is spaced from the associated cam slope 50 or 51 respectively. A transverse pin 60 constituting a cylindrical bearing element is carried by each shoe 53 and 54, the pin 60 being of a hardened steel and projecting beyond the inner shoe surface 57 to engage the associated cam slope 50 or 51. It will be importantly noted that the transverse shoe pin 60 holds the shoe body 53 or 54 away from and in spaced relation to the associated cam slope 50 or 51 so that the shoe can tip or turn about the transverse line contact of the pin 60 with the cam slope 50 or 51 as the shoe 53 or 54 wears.

It will be particularly noted that the transverse line contact of the pin 60 with the associated cam slope 50 or 51 is offset in the direction of shoe movement to overcome the wedging action from a radial line indicated by reference number 61 in FIG. 3 extending from the shaft axis to the center of the outer bearing surface 56 of the shoe 53 or 54. This structural arrangement enables the shoe 53 or 54 to turn about the line contact as the shoe wears in order to provide a greatly extended life to the shoe under severe load conditions.

A release plate 62 is rotatively mounted about the shaft 14 and is located within the lock housing 40 immediately behind the came 45. As is seen best in FIG. 2, the release plate 62 extends the entire width of the rear housing opening to close such housing 40 and hence cooperates with the housing 40 to hold the cam 45, shoes 53 and 54 and springs 55 in assembly. A retaining ring 63 is snapped into engagement with the housing 40 immediately behind the release plate 62 to hold the release plate 62 in assembly with the housing 40.

The release plate 62 includes a plurality of projections 64 (a total of three in the embodiment disclosed) disposed between the cam 45 and the reaction surface 52 and separating the pairs of shoes 53 and 54. As will appear upon later description of parts, the projections 64 will engage either the shoes 53 or 54 upon turning the release plate 62 in either direction so as to back off the engaged shoes 53 or 54 a sufficient distance to release the cam 45 and hence the shaft 14 for turning action in the same direction.

Projecting rearwardly from the release plate 62 and outwardly of the lock housing 40 are a pair of ears 65 that interfit compatible slots 66 formed in the front face of gear 17. The release plate ears 65 extend through the casing opening 13 and into the interior of the casing 10 for operative drive connection with the gear 17. The drive connection provided by ears 65 and slot 66 is such that gear 17 will turn the release plate 62, yet such connection will be operatively disengaged by sliding the lock assembly as a unit axially along and off the end of the shaft 14.

It is thought that the operation and functional advantages of this bi-directional lock assembly have become fully apparent from the foregoing detailed description of parts, but for completeness of disclosure such operation will be briefly described.

It will be assumed that the lock unit has been assembled and that the user has selected to rotate shaft 14 by meshing gear 32 with gear 17 as illustrated in FIG. 2. Of course, the gear ratio can be changed by meshing gear 33 with gear 16 if desired. The overall operation of the bi-directional lock will be the same in each case.

Furthermore, it will be assumed for purposes of illustration that the shaft 14 is subjected to a torque tending to turn the shaft in one direction as a result of a load applied to the shaft, as for example, a load applied to a landing strut disclosed in each of the previously mentioned U.S. patents. It will be assumed that the user wishes to retract the landing strut which necessitates turning the shaft 14 in the same direction in which the load torque is applied. This situation will clarify the feature of the invention which prevents the bi-directional lock from relocking itself as a result of the tendency of the cam 45 to override.

As the shaft 24 is rotated by a crank or by some power means, the double gear 31 will drive the double gear 18 and the driven shaft 14 in the opposite direction. Because of the lost-motion between gear 18 and shaft 14, the initial movement of gear 18 will be to rotate the release plate 62 through the drive connection of ears 65 in gear slots 66, without driving or turning the shaft 14. This slight movement of release plate 62 causes the projections 64 to back off either the shoes 53 or 54, depending upon the direction of rotation, a sufficient distance to unwedge such shoes and permit the shaft 14 to turn upon continued driving of the double gear 18 in the same direction. As the shaft 14 is turned, the shaft 14 will rotate the cam 45. Because the shoes 53 or 54 are backed off a distance depending upon the torque applied to shaft 14 tending to turn the shaft 14 in the same direction, the same load applied by the cam slopes 50 or 51 to the shoes 53 or 54 overcomes the friction between the shoe bearing surfaces 56 and the reaction surface 52 whereby the came 45 and shoes can turn. Yet it will be importantly noted that sufficient friction is maintained between the shoes 53 or 54 and the reaction surface 52 to preclude cam 45 from overriding to relock itself. Thus the drive of shaft 14 will be completely smooth and continuous without any shocks or jerks such as would be caused by a series of successive wedgings and unwedgings of the shoes.

As soon as the drive ceases to operate, the springs 55 urge the shoes 53 and 54 into wedging engagement between the cam slopes and the reaction surface 52 to again establish a locking condition that maintains the shaft 14 against rotation in either direction.

At times it is desirable and necessary to gain access to the interior of casing 10 in order to service double gears 18 and 31 or shafts 14 and 24 or the shaft mountings. To accomplish this, the lock unit housing 40 is detached from the front casing wall 12 by removal of the cap screws 42, and the cam sleeve 46 is detached from the shaft 14 by the removal of the bolt and nut connection 47. Then, the lock is moved slidably along and off the end of shaft 14 as a unit. The release plate ears 65 move out of the gear slots 66 upon such relative axial movement. It will be importantly noted that the lock can be removed from the shaft without requiring that the lock be taken apart in order to gain access through the casing opening 13 into the interior of the casing 10. After the completion of any service, the lock can be readily reassembled by merely slipping the lock as a unit over the end of shaft 14 and slidably moving the lock as a unit along the shaft 14 until the release plate ears 65 re-enter the gear slots 66 for operative connection. Then, the bolt and nut connection 46 is applied to attach the cam 45 to the shaft 14, and the cap screws 42 are used to secure the housing 40 to the casing front wall 12.

Although the invention has been described by making detailed reference to a single preferred embodiment, such detail is to be understood in an instructive, rather than in any restrictive sense, many variants being possible within the scope of the claims hereunto appended.

I claim as my invention:

1. A bi-directional lock comprising:
   (a) a driven shaft,
   (b) a cam drivingly carried by the shaft and having a plurality of pairs of opposed slopes thereon,
   (c) a fixed member providing a reaction surface surrounding the cam,
   (d) a plurality of pairs of friction shoes disposed between the cam slopes and reaction surface, each shoe having an outer bearing surface slidably engaging the reaction surface,
   (e) means on each shoe contacting the associated cam slope to provide a pivot axis about which the shoe turns as the outer bearing surface wears so as to extend the shoe life,
   (f) resilient means interposed between each pair of shoes tending to hold the shoes in wedging engagement with the cam slopes and reaction surface to lock the cam and shaft to the fixed member against movement in either direction,
   (g) a release plate rotatively mounted on the shaft including projections disposed between the cam and reaction surface and separating the pairs of shoes, and
   (h) a driving member connected to the driven shaft for limited movement thereto and operatively connected to the release plate,
   (i) the projections backing off one shoe of each pair of shoes in a direction a sufficient distance depending on a torque applied to the shaft tending to turn the shaft in the same direction so that the same load applied by the cam to the shoes overcomes the sliding friction between the shoes and reaction surface whereby the cam and shoes can turn, yet maintains sufficient friction between the shoes and reaction surface to preclude the cam from overriding to relock itself.

2. A bi-directional lock comprising:
   (a) a driven shaft,
   (b) a cam drivingly carried by the shaft and having a plurality of pairs of opposed slopes thereon,
   (c) a fixed member providing a reaction surface surrounding the cam,
   (d) a plurality of pairs of friction shoes disposed between the cam slopes and reaction surface, each shoe having an outer bearing surface slidably engaging the reaction surface,
   (e) means on each shoe contacting the associated cam slope to provide a pivot axis for the shoe, the pivot axis provided by contact of the means with the associated cam slope being offset from a radial line extending from the axis of the shaft to the center of the outer bearing surface of the shoe, the shoe turning about the pivot axis as the outer bearing surface wears so as to extend the shoe life,
   (f) resilient means interposed between each pair of shoes tending to hold the shoes in wedging engagement with the cam slopes and reaction surface to lock the cam and shaft to the fixed member against movement in either direction,
   (g) a release plate rotatively mounted on the shaft including projections disposed between the cam and reaction surface and separating the pairs of shoes, and
   (h) a driving member connected to the driven shaft for limited movement thereto and operatively connected to the release plate,
   (i) the projections backing off one shoe of each pair of shoes in a direction a sufficient distance depending on a torque applied to the shaft tending to turn the shaft in the same direction so that the same load applied by the cam to the shoes overcomes the sliding friction between the shoes and reaction surface whereby the cam and shoes can turn, yet maintains sufficient friction between the shoes and reaction surface to preclude the cam from overriding to relock itself.

3. A bi-directional lock comprising:
   (a) a driven shaft,
   (b) a cam drivingly carried by the shaft and having a plurality of pairs of opposed slopes thereon,
   (c) a fixed member providing a reaction surface surrounding the cam,
   (d) a plurality of pairs of friction shoes disposed between the cam slopes and reaction surface, each shoe having an outer bearing surface slidably engaging the reaction surface,
   (e) a cylindrical bearing element carried transversely of the inner side of each shoe, the cylindrical bearing element contacting the associated cam slope and providing a pivot about which the shoe turns as the outer bearing surface wears so as to extend the shoe life,
   (f) resilient means interposed between each pair of shoes tending to hold the shoes in wedging engagement with the cam slopes and reaction surface to lock the cam and shaft to the fixed member against movement in either direction,
   (g) a release plate rotatively mounted on the shaft including projections disposed between the cam and reaction surface and separating the pairs of shoes, and
   (h) a driving member connected to the driven shaft for limited movement thereto and operatively connected to the release plate,
   (i) the projections backing off one shoe of each pair of shoes in a direction a sufficient distance depending on a torque applied to the shaft tending to turn the shaft in the same direction so that the same load applied by the cam to the shoes overcomes the sliding friction between the shoes and reaction surface whereby the cam and shoes can turn, yet maintains sufficient friction between the shoes and reaction surface to preclude the cam from overriding the relock itself.

4. A bi-directional lock as defined in claim 3, in which:
(j) the transverse line contact of each cylindrical bearing element with its associated cam slope is offset in the direction of shoe movement to overcome the wedging action from a radial line extending from the axis of the shaft to the center of the outer bearing surface of the associated shoe.

5. A bi-directional lock comprising:
(a) a driven shaft,
(b) a cam drivingly carried by the shaft and having a plurality of pairs of opposed slopes thereon,
(c) a fixed member providing a reaction surface surrounding the cam,
(d) a plurality of pairs of friction shoes disposed between the cam slopes and reaction surface, each shoe having an outer bearing surface slidably engaging the reaction surface,
(e) a cylindrical roller carried transversely of the inner side of each shoe, and contacting the associated cam slope in a transverse line contact that is offset in the direction of shoe movement to overcome the wedging action from a radial line extending from the axis of the shaft to the center of the outer bearing surface of the shoe, the roller holding the inner side of the shoe in spaced relation to the associated cam slope to enable turning of the shoe as the shoe wears,
(f) resilient means interposed between each pair of shoes tending to hold the shoes in wedging engagement with the cam slopes and reaction surface to lock the cam and shaft to the fixed member against movement in either direction,
(g) a release plate rotatively mounted on the shaft including projections disposed between the cam and reaction surface and separating the pairs of shoes, and
(h) a driving member connected to the driven shaft for limited movement thereto and operatively connected to the release plate,
(i) the projections backing off one shoe of each pair of shoes in a direction a sufficient distance depending on a torque applied to the shaft tending to turn the shaft in the same direction so that the same load applied by the cam to the shoes overcomes the sliding friction between the shoes and reaction surface whereby the cam and shoes can turn, yet maintains sufficient friction between the shoes and reaction surface to preclude the cam from overriding to relock itself.

6. A bi-directional lock as defined in claim 5, in which:
(j) each shoe is constructed of a sintered bronze having a high coefficient of friction, and
(k) the roller of each shoe is constructed of a hardened steel.

7. In a bi-directional lock assembly:
(a) a casing,
(b) a driven shaft extending through the casing,
(c) a drive member in the casing and connected to the shaft for limited movement thereto,
(d) a lock comprising a housing located about the shaft, the housing having an internal peripheral reaction surface,
(e) means detachably connecting the housing to the casing,
(f) a cam located in the housing and having a plurality of pairs of opposed slopes,
(g) means detachably connecting the cam to the shaft outwardly of the housing, the cam being rotatable with the shaft,
(h) a plurality of pairs of friction shoes disposed between the cam slopes and reaction surface and having a sliding contact with the reaction surface,
(i) resilient means interposed between each pair of shoes tending to hold the shoes in wedging engagement with the cam slopes and reaction surface to lock the cam and shaft to the housing,
(j) a release plate in the housing and rotatively mounted on the shaft, the release plate including projections disposed between the came and reaction surface and separating the pairs of shoes,
(k) means retaining the cam, release plate, shoes and resilient means in the housing, and
(l) a driving connection between the release plate and drive member including interfitting parts that are separable upon axial movement of the lock along the shaft, the projections backing off the shoes a sufficient distance depending on a torque applied to the shaft tending to turn the shaft in the same direction so that the same load applied by the cam to the shoes overcomes the friction between the shoes and the reaction surface whereby the cam and shoes can turn, yet maintains sufficient friction between the shoes and reaction surface to preclude the cam from overriding to relock itself,
(m) the housing being detachable from the casing and the cam being detachable from the shaft to enable the lock to be moved off the shaft as a unit in order to gain access to the drive member.

8. In a bi-directional lock assembly:
(a) a casing,
(b) a driven shaft extending through the casing,
(c) a drive member in the casing and connected to the shaft for limited movement thereto,
(d) a lock comprising a cup-shaped housing detachably fixed to the casing and located about the shaft, the housing having an internal peripheral reaction surface,
(e) a cam located in the housing and detachably connected to the shaft so as to be rotatable therewith, the cam having opposed slopes,
(f) a pair of friction shoes disposed between the slopes and reaction surface and having sliding contact with the reaction surface,
(g) resilient means interposed between the shoes tending to hold the shoes in wedging engagement with the cam slopes and reaction surface to lock the cam and shaft to the housing,
(h) a release plate substantially closing the open end of the housing to retain the shoes, resilient means and cam in the housing, the release plate including projections disposed between the cam and reaction surface and operatively connected to the shoes,
(i) means retaining the release plate in assembly with the housing, and
(j) a driving connection between the release plate and drive member including interfitting parts that are separable upon axial movement along the shaft,
(k) the housing being detachable from the casing and the lock being movable off the shaft as a unit in order to gain access to the drive member without taking the lock unit apart.

9. In a bi-directional lock assembly:
(a) a casing,
(b) a driven shaft extending through the casing,
(c) a drive member in the casing and connected to the shaft for limited movement thereto,
(d) a drive-and-lock unit including a cup-shaped housing detachably fixed to the casing and located about the shaft, the housing having an internal peripheral reaction surface,
(e) a cam located in the housing, the cam having a collar extending out one end of the housing and detachably connected to the shaft for rotation therewith, the cam having a plurality of pairs of opposed slopes,
(f) a plurality of pairs of friction shoes disposed between the cam slopes and reaction surface and slidably engaging the reaction surface,
(g) resilient means interposed between each pair of shoes tending to hold the shoes in wedging engagement with the cam slopes and reaction surface to lock the cam and shaft to the housing, (h) a release plate in the housing and rotatively mounted on the shaft, the release plate including projections disposed between the cam and reaction surface and separating the pairs of shoes,
(i) means retaining the cam, release plate, shoes and resilient means in the housing, and
(j) a driving connection between the release plate and the drive member, the projections backing off the shoes a sufficient distance depending on a torque applied to the shaft tending to turn the shaft in the same direction so that the same load applied by the cam to the shoes overcomes the friction between the shoes and reaction surface whereby the cam and shoes can turn, yet maintains sufficient friction between the shoes and reaction surface to preclude the cam from overriding to relock itself,
(k) the driving connection between the release plate and the drive member including interfitting parts that are separable upon axial movement along the shaft,
(l) the housing being detachable from the casing and the lock being movable off the shaft as a unit in order to gain access to the drive member without taking the lock unit apart.

References Cited by the Examiner

UNITED STATES PATENTS

| | | | |
|---|---|---|---|
| 1,858,066 | 5/1932 | Verderber | 192—8 |
| 1,942,472 | 1/1934 | Crow | 192—8 |
| 1,946,048 | 2/1934 | Verderber | 192—45.1 X |
| 2,240,932 | 5/1941 | Kinser | 192—8 |
| 2,429,901 | 10/1947 | Spraragen | 192—8 |
| 2,787,353 | 4/1957 | Spraragen | 192—8 |
| 2,973,070 | 2/1961 | Firth et al. | 192—8 |
| 2,973,842 | 3/1961 | Smiley | 192—107 |
| 3,102,618 | 9/1963 | Lund | 192—8 |

FOREIGN PATENTS

| | | |
|---|---|---|
| 565,023 | 11/1932 | Germany. |
| 587,020 | 10/1933 | Germany. |

DAVID J. WILLIAMOWSKY, *Primary Examiner.*